United States Patent Office 3,375,078
Patented Mar. 26, 1968

3,375,078
DETERMINATION OF DEPLETION OF DISSOLVED OXYGEN CONTENT IN WATER
John Stiles Dendy, 315 Woodfield Drive, Auburn, Ala. 36830
No Drawing. Filed Feb. 12, 1964, Ser. No. 344,238
9 Claims. (Cl. 23—230)

ABSTRACT OF THE DISCLOSURE

A method and means of determining dissolved oxygen in water by disposing in the water a color indicator comprising a carrier containing tannic acid thereon which will change color due to the reaction of dissolved ferrous iron in the water from which can be determined the amount of oxygen in the water.

This invention relates to a process of determining the dissolved oxygen content in ponds, lakes, reservoirs, streams, etc., an indicator for carrying out said process and a process of preparing said indicator. More specifically it deals with a process of producing an indicator by affixing to a carrier a suitable reagent which when exposed to water will produce a color change in response to the iron content of the water. From the iron content of the water the dissolved oxygen content of the water can be determined. The amount of dissolved oxygen is inversely proportional to the iron content of the water.

Water of ponds, lakes, reservoirs and streams that contain enough dissolved oxygen to maintain the presence of and life of fish therein has little or no dissolved compounds of iron in them. Said waters lacking dissolved oxygen or with very minute amounts thereof, 0.1 to 0.2 part per million, have appreciable quantities of dissolved ferrous iron contained therein and will not maintain the presence of fish or the life of fish.

It is an object of the present invention to provide a new process for determining the depletion of dissolved oxygen in water by disposing an indicator in said water and determining the oxygen content of the water from the color change of the indicator.

Another object of the instant invention is to provide a color indicator which, after being disposed in water, upon examination will disclose the oxygen content of the water or lack thereof.

A further object of the invention is to provide a process for producing an indicator which will show the oxygen content of water at various depths within a few minutes, by means of applying a suitable reagent to a carrier.

A still further object of the instant invention is to provide a new process for determining the depletion of dissolved oxygen in water which requires no elaborate apparatus or chemical analysis and which is capable of detecting small quantities of dissolved oxygen in water.

Another object of the instant invention is to provide an indicator for determining the depletion of small quantities of dissolved oxygen in water which requires no specialized training for its use, and is capable of being exposed to all depths at the same time, thus making repeated tests at different depths unnecessary.

A more specific object of the instant invention is to provide a process for fixing tannic acid or other suitable chemical serving the purposes of the invention on a carrier in the precise amount so that small quantities of dissolved oxygen in water can be readily determined.

Other objects and advantages of the instrument invention will become apparent from the following detailed description.

The process of the instant application involves the fixing of tannic acid or other suitable reagent on a carrier and the exposing of the carrier to water in order to determine whether or not iron in the water stains the tannic acid and thereby indicates that depletion of dissolved oxygen has proceeded to such an extent that detectable quantities of iron are present. A color change produced by the reaction of minute quantities of dissolved ferrous iron with the tannic acid is so distinct that tannic acid can be used as an indicator of the presence of absence of ferrous iron in water. If such stain results, there is an indication that no more than, and probably less than, 0.2 part per million of dissolved oxygen is present in the stratum of water at the depth at which the staining occurred. A dark stain (a purplish blue) indicates water with no oxygen, and between dark stain and no stain indicates the zone of transition between the complete absence of oxygen and a concentration of more than 0.2 part per million. The carrier may be lowered into the water to the depth that the operator desires to test by means of a weight if necessary. After five to ten minutes of exposure in the water, the carrier can be withdrawn for examination.

The process of the instant invention has many advantages over prior processes for determining oxygen content. With the carriers of the instant invention no elaborate apparatus or chemical analysis is required for determining depletion of dissolved oxygen. No specialized training is required of the person using the process. The reaction is rapid, only five to ten minutes, and the sensitized carriers can be made available at very low cost. The carries is exposed at all depths at the same time when in the water and for this reason repeated tests at different depths to attain the desired information are not required. This method has been used experimentally in fertilized fish ponds, in fish ponds that receive supplemental feeding, in a barren quarry pond, and in city water supply lakes. It has been checked by chemical and by electrometric methods for determining the concentration of dissolved oxygen.

The rate at which the concentrations of dissolved oxygen diminish as depth of water increases is related to the bio-chemical oxygen demand (BOD) in the water. If the BOD value is high, the concentration of dissolved oxygen may decline from 8 p.p.m. or more to 0.0 p.p.m. with an increase in depth amounting to a few feet. If the BOD value is low there may be no great depletion of oxygen or the depletion may be quite gradual with the increase in depth. For this reason, if a conspicuous change in the staining of a sensitized carrier occurs within a layer of water a foot thick, one would expect an ample supply of oxygen to be present only a foot or two above the point where light staining ceases. If the change from conspicuous stain to very slight stain extends through a vertical distance of 5 to 10 feet, however, one may expect the increase in concentration of dissolved oxygen to be quite gradual above the level of the slight stain. A distinct change in intensity of stain within a short distance is typical of fertilized fish ponds and other bodies of water that are rich in organic matter. These are usually small and shallow bodies of water. Large deep lakes, especially infertile ones, usually have lower BOD values and would be expected to have a gradual decline in concentration of dissolved oxygen in the deeper layer of water. For these reasons and because the sensitized carriers are stained in waters that have little or no dissolved oxygen and give no information regarding concentrations greater than 0.2 p.p.m., this invention will be of great value in the richer waters that produce large crops of fish per acre. In poorer waters these devices may be of more value to fisheries biologists than to fishermen.

With regard to the preparation of the indicator I have found that reagents which will detect small amounts of ferrous iron in water can be used for determining the amount of dissolved oxygen in the water. The preferred reagent used in tannic acid, although any other suitable reagent which can be fixed to a carrier and is capable of detecting minute quantities of ferrous iron in water may be used. In preparing the indicator using tannic acid it is necessary that the tannic acid be fixed onto a carrier which is retrievable for observation. The tannic acid must be fixed onto the carrier in such a way so that it will not dissolve into the water and become lost. Tannic acid is highly soluble in water but can be fixed onto the carriers by several substances such as salts of heavy metals, alkaloids, gelatin, albumin, starch, permanganates, chlorates, spirit nitrous ether, and lime water. Of these fixatives, the lime water appears to be the cheapest and is effective. The tannic acid used is available in powder form from chemical supply houses, and comes in a purified grade and in a technical grade. The technical grade is sufficient and is less expensive than the purified grade. Tannic acid occurs naturally in many plants that are present in tropical ozones throughout much of the world. The transfer of tannic acid from plant materials to carriers is possible; however, this would probably be much more expensive than the use of prepared tannic acid.

The indicator may be prepared by the following method:

The carrier is sensitized with a solution of 1.0 to 0.1 part of tannic acid by weight in 100 parts of water. This solution is sufficiently strong to produce good stain. The sizing that is present in many cotton products contains sufficient starch to fix the tannic acid when the carrier is boiled for 5 to 10 minutes in the tannic acid solution. A more satisfactory fixative is a weak solution of lime water, made of 1 to 0.1 part of $Ca(OH)_2$ in 1,000 parts of water. The sizing that is on most cotton products can be removed or left on the material. Either the tannic acid or the lime water can be applied first. The carrier can be soaked in the solution for several minutes at room temperature or the tannic acid can be applied hot with better results. If the lime water is applied first, it should be partially removed by compression or centrifugation before the carrier is placed in the tannic acid. Excess tannic acid can be removed to hasten drying. If the tannic acid is applied first, part of it should be removed before the carrier is placed in the lime water. An excess of lime water causes a brown discoloration of the tannic acid on the carrier. This can be rinsed off if it is not left too long. The color does not prevent the staining, but reduces the contrast between stained and unstained carriers. The addition of a wetting agent improves the penetration of the lime water. After drying, the carrier is ready for use or packaging. Carriers made of loosely twisted twine receive the tannic acid and the lake water more readily than tightly twisted material. The loosely twisted material stains more rapidly and more darkly than tightly twisted material.

A better understanding of the process of forming the indicator will be seen from the following specific example:

*Example 1*

A carrier was soaked in water with a little wetting agent and then most of the water was removed from the carrier leaving it only damp. The carrier was then soaked in dilute lime water, 1 to 0.1 part per 1,000, and the lime water was removed until the carrier was only damp. The carrier was then soaked in 1.0 to 0.1% tannic acid and then dried, at which time only a little tannic acid was removed. Removing tannic acid will hasten drying but may reduce the intensity of the stain.

With regard to the form of the indicator, sensitized pieces of cord or rope, glued at one end to prevent fraying and frayed at the other end to produce intense color of stain, can be made to tie onto a fisherman's line for exposure in water at various depths to determine how deep he should place his bait and yet avoid fishing in water that has too little oxygen to support fish. A ball of loosely twisted twine can be sensitized and marked at intervals. This twine can be so inexpensive that a fisherman can afford to break off and discard the stained end but keep the unstained portion for use another time. Other suitable carriers, such as cotton materials in the form of tape, twine, string or rope may be used. It is also possible to use nylon materials, in the form of tape, twine, string or rope, paper, wood, or synthetic plastics. Of the above materials, cotton appears to be satisfactory and is the cheapest. A rope or string can be supplied with additional chemicals for removing that stain and for resensitizing the carrier. Clorox will bleach the stain. The sensitized carriers can be marked at intervals (of one foot, one yard, or one meter) for convenience of the observer in determining the depth at which staining occurs.

The above product may be used by fisherman to determine where not to fish and where to fish. It may also be used by fisheries biologists to determine depths at which oxygen troubles in water exist. Other uses are by sanitary engineers to determine severe oxygen depletion in polluted waters or in reservoirs for water supplies. Pond owners and fish culturists may use the above product to determine when and at what depths water is likely to give trouble because of oxygen depletion. Other uses are for determination of depths at which water is unsuitable for most aquatic animal life and at which photosynthesis is inadequate to counterbalance the effects of decay.

As stated above, the invention provides a process for determining the deplection of dissolved oxygen in water within a few minutes requiring no elaborate apparatus nor specialized training. Any reagent which is capable of being fixed on a carrier and which is sensitive to small amounts of dissolved ferrous iron can be used. To facilitate a quick determination of the oxygen content any type of instructions or charts showing various oxygen contents in relation to varying color changes may accompany the indicator.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. A process for determining dissolved oxygen in amounts of from 0 to 0.2 part per million in naturally occurring bodies of water containing iron oxide comprising disposing a carrier containing tannic acid thereon in the water to be tested and determining the oxygen content of the water from the color change of the tannic acid caused by the reaction of tannic acid with any dissolved ferrous iron.

2. The process of claim 1 wherein the carrier is selected from the group consisting of cotton, paper, wood and plastic.

3. The process of claim 1 wherein the carrier is disposed in the water from 5 to 10 minutes.

4. A process for preparing a color indicator for determining dissolved oxygen in amounts of from 0 to 0.2 part per million in naturally occurring bodies of water containing iron oxide comprising soaking a carrier selected from the group consisting of cotton, paper, wood and plastics, in water and a wetting agent, removing excess water, next soaking said carrier in a fixative selected from the group consisting of alkaloids, gelatin, albumin, starch, spirit nitrous ether, and lime water, removing excess fixative, then soaking said carrier in tannic acid and subsequently drying said carrier.

5. The process of claim 4 wherein the fixative is lime water.

6. The process of claim 5 wherein the lime water is in a concentration of from 1 to 0.1 part per 1,000.

7. The process of claim 4 wherein the tannic acid is in a concentration of from 1.0 to 0.1%.

8. A color indicator for determining dissolved oxygen in amounts of from 0 to 0.2 part per million in naturally occurring bodies of water containing iron oxide comprising a carrier selected from the group consisting of cotton, paper, wood and plastics containing thereon tannic acid and a fixative selected from the group consisting of heavy metal salts, alkaloids, gelatin, albumin, starch, premanganates, chlorates, spirit nitrous ether and lime water.

9. The indicator of claim 8 wherein the carrier is a cord visibly marked at intervals of length to indicate depth.

References Cited

UNITED STATES PATENTS

| 2,676,874 | 4/1954 | Devine | 23—230 |
| 2,912,309 | 11/1959 | Free | 23—253 |
| 2,967,092 | 1/1961 | Buchoff | 252—408 X |

OTHER REFERENCES

Prescott et al., "Qualitative Chemical Analysis," 1901, p. 154.

Fair et al., "Water Supply and Waste Water Disposal," 1054, pp. 550–551. Scientific Library TD 145 F3 C2.

Chemical Week, Nov. 1, 1952, p. 32, Scientific Library, and 23–230.

MORRIS O. WOLK, *Primary Examiner.*

JOSEPH SCROVRONEK, *Examiner.*

R. E. SERWIN, *Assistant Examiner.*